INVENTOR.
LOUIS D. STATHAM
BY Philip Subhov
ATTORNEY

United States Patent Office 2,889,527
Patented June 2, 1959

2,889,527

ELECTRICAL STRAIN WIRE TRANSDUCER

Louis D. Statham, Beverly Hills, Calif., assignor to Statham Instruments, Inc., a corporation of California Application January 7, 1957, Serial No. 632,921

12 Claims. (Cl. 338—4)

This application is a continuation-in-part of my application Serial No. 605,098, filed August 20, 1956, which in turn is a continuation-in-part of application Serial No. 502,663, filed April 20, 1955, now Patent No. 2,760,037.

This invention relates to transducers in which the force of displacement induces a variation in tension in a tensioned member and means are provided for determining the variation in tension in the tensioned member. It is more particularly directed to the use of two tensioned members, one end of the first tensioned member being connected to a force summing means undergoing displacement as the result of a force or motion applied to the force summing means, and the other end is connected to a yieldable constraining means, the second tensioned member being also connected at one end to the constraining means. The other end of the second tensioned member is also connected to a force summing means, so that upon motion of one or both of said force summing means there results a movement, relative to each other, of the ends of the tensioned members which are not connected to the yieldable constraining means. Various means capable of responding to the variation in tension in the tensioned members in order to sense or measure the variation of the tension in the tensioned members may be employed.

Generally stated, my invention relates to a transducer consisting of a pair of force summing members and at least two tensioned members, each of which is attached at first and second points of attachment and extending therefrom in tension to a third common point of attachment, both of said tension members at said third point of attachment being connected to a yieldable constraining means including motion transmitting connections between each of said force summing members and said first and second points of attachment, and means whereby on displacement of said force summing means, a displacement of said first and second points of attachment from said third point of attachment occurs.

The first and second points of attachment of the tension members to their respective force summing means, referred to above, may move in opposite directions to each other or in the same direction and the first point of attachment may move to a degree more or less than the second point of attachment. The motions of the respective force summing members may produce a change in the tension in the respective tension members such that the tensions in both tension members may be increased by the same or different amounts, the tensions in both tension members may be relaxed by the same or different amounts, or the tension in one tension member may be increased while the tension in the other tension member is reduced, and said last mentioned increase and reduction in tension may be the same or different.

In the preferred embodiment of my invention, the constraint imposed upon said third point of attachment should preferably have a spring rate which is substantially less than the spring rate of the tensioned members. The spring rate as referred to in this specification is understood to be the ratio of the force exerted on the tensioned members and the constraining means respectively to the displacement of the constraining means and the tensioned member respectively. Thus the ratio of a given force exerted on the tensioned members and the constraining means respectively to the variation in strain in the tension members should be much greater than the ratio of such force to the displacement of the constraining means. Where, as in the preferred embodiment, the constraining means is a spring, the extension or movement of the spring resulting from the application of a given magnitude of force to the force summing means should be greater than the variation in the strain in the tension members resulting from the application of a force of the same magnitude and direction. As will be understood by those skilled in the art, the spring rate is the Hook's law constant of the tensioned members and of the constraining means where such constraining means is a spring.

Applying the principles of the invention, for example, in the form of a differential pressure transducer, one of the tension members is connected at one end to a pivoted beam, said beam being capable of pivotal motion by a rod operated in response to movement of a pressure actuated bellows. The other end of this tension member is connected to the free end of a spring connected at its opposite end to the frame. The second tension member has one end connected to a second pivoted beam which may be subjected to pivotal motion by a second rod operable in response to movement of a second pressure actuated bellows. The pressures applied to the respective bellows may cause an increase in tension of both tension members, a decrease in tension in both tension members, or a decrease in tension in one tension member and a relaxation of the other tension member. The change in resistance in the wires due to these changes in tension in the wires can be sensed by any suitable sensing means calibrated to indicate the differential pressure between the pressures applied to the respective bellows.

The device of the invention has the additional advantage that where the tensioned members may be subject to damage because of an excessive application of tension thereto, the transducer of my invention, through the yieldable constraining means to which both tension members are connected, acts to introduce an overload safety means to prevent an exertion of tension in excess of the safe tension load which may be imposed upon the strain wires. These and other objects of my invention will be further described in connection with the drawings in which—

Figure 1:
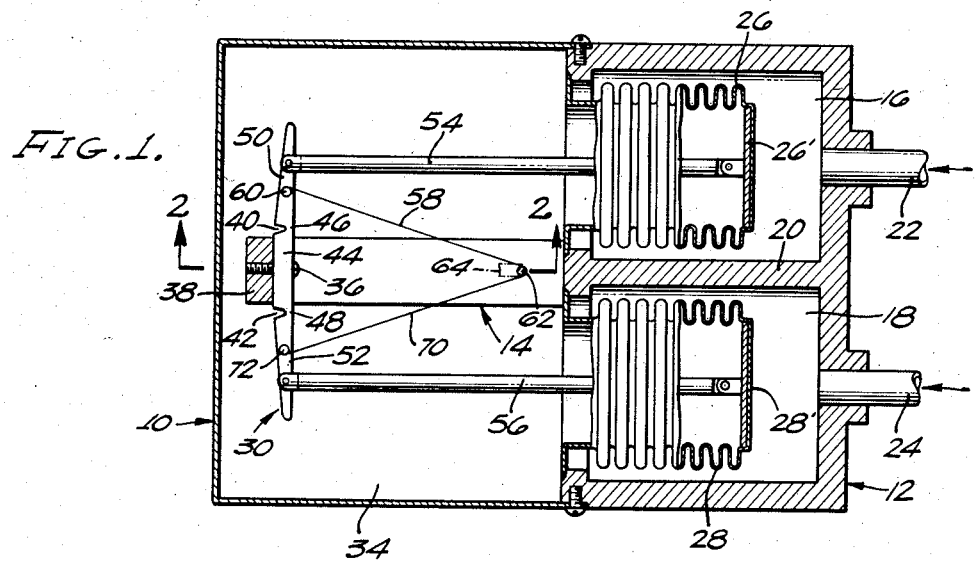
Fig. 1 is a horizontal section of a transducer in the form of a differential pressure gage according to the invention.
Figure 2:
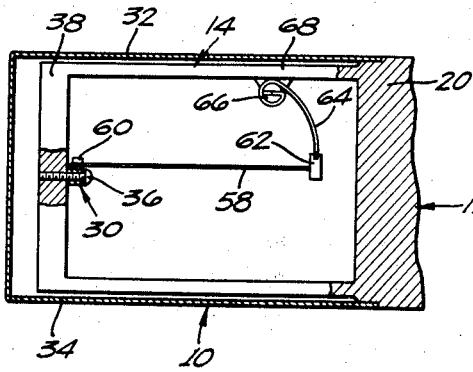
Fig. 2 is a vertical section taken on line 2—2 of Fig. 1.

Referring to Figs. 1 and 2 of the drawing, numeral 10 represents a case, to one end of which is connected a pressure fluid head 12. Within case 10 and integrally connected to the pressure fluid head 12 is a frame 14.

Pressure head 12 is divided into two separate compartments or chambers 16 and 18 by a partition 20, each of said chambers having separate pressure fluid inlets 22 and 24, respectively, mounted in the outer end wall of said chambers. Connected to the inner end wall of each of chambers 16 and 18 are pressure bellows 26 and 28, respectively, the outer ends of said bellows being closed by end plates 26' and 28'. Bellows 26 and 28 are each a movable force summing means.

A beam member 30 positioned in a plane parallel to the top 32 and bottom 34 of the case, is connected at its center by means of a screw 36, to an outer vertically extending cross member 38 of frame 14. In the beam member 30 are cut a pair of notches 40 and 42 located between the center 44 of the beam member and its opposite outer ends, each of said notches being positioned substantially the same distance away from the center of the beam member 30. Notches 40 and 42 each provides a narrow neck 46 and 48 of material, forming hinges on which the opposite outer ends 50 and 52 of beam member 30 can be pivoted. Hence, said outer beam ends 50 and 52 in effect form separate beams which can pivot at hinges 46 and 48, respectively, on the fixed central portion 44 of beam member 30. A motion transmitting connection or rod 54 connects beam 50 with the outer end plate 26' of bellows 26, and a similar motion transmitting connection or rod 56 connects beam 52 with the outer end plate 28' of bellows 28. Thus, movement of rods 54 and 56 will impart pivotal motion to beams 50 and 52.

An electrical resistance strain wire 58 is connected in tension between an insulated pin 60 forming a second wire suport on beam 50 and an insulated pin 62 forming a second wire support carried at the outer free end of a yieldable constraining means in the form of a flat spring 64 connected at its other end by means of a fastener 66 to the upper horizontal cross member 68 of frame 14. A second strain wire 70 is stretched between an insulated pin 72 forming a third wire support on beam 52 and the pin 62 of spring 64. The sum of the tension in wires 58 and 70 is less than the ultimate tensile stress of the wires. Spring 64 preferably has a much smaller spring constant than strain wires 58 and 70, and hence is much less stiff than the strain wires. It will be seen that the tension of wires 58 and 70 causes the spring 64 to assume a bowed or bent position. The strain wires can be connected in a bridge circuit, as well understood in the art, to sense changes in resistances in the wires resulting from changes in tension therein.

In operation, separate fluids introduced into chambers 16 and 18 via inlets 22 and 24 produce a contraction or expansion of the force summing means or bellows 26 and 28, causing longitudinal movements of the motion transmitting connections or rods 54 and 56. Fluids under positive pressure will produce a contraction of the bellows while fluids under a negative pressure producing a partial vacuum in chambers 16 and 18 will cause expansion of the bellows.

Assuming positive fluid pressure is applied in chambers 16 and 18 against both force summing means or bellows, the resulting longitudinal movement of motion transmitting rods 54 and 56 will produce counterclockwise pivotal motion of beam 50 on its hinge 46, producing counterclockwise motion of the first wire support 60, and clockwise pivotal motion of beam 52 on its hinge 48, producing clockwise motion of the third wire support 72. This will result in a tensioning of both of strain wires 58 and 70 against the action of the yieldable constraining means or spring 64. If the pressures applied in chambers 16 and 18 are the same, the increase in resistance due to tensioning of both strain wires will be the same, and no change in output from the bridge will result. However, if the pressure in one chamber, say 16, is greater than that in the other chamber, strain wire 58 will be placed under greater tension than wire 70, causing a change in output which is linear or proportional to the relative changes in resistance of the wires due to greater pivotal motion of beam 50 than beam 52, and hence such change in output is also linear to the differential pressure.

It will be noted that the yieldable constraining means or spring 64 prevents overloading of the strain wires 58 and 70, and permits relatively large counterclockwise rotation of beam 50 and clockwise rotation of beam 52, which movements place added tension on the wires, before the strain wires approach their safe maximum tension.

If the fluids introduced in chambers 16 and 18 are both at a pressure less than in case 10, so as to place chambers 16 and 18 under a negative pressure or partial vacuum, longitudinal movement of motion transmitting rods 54 and 56 due to the resulting expansion of both force summing bellows will cause beam 50 to pivot clockwise on its hinge 46, with beam 52 pivoting counterclockwise on its hinge 48. This will cause both strain wires 58 and 70 to relax. If the pressures in chambers 16 and 18 are alike, the amount of relaxation in both wires will be equal, and there will be no output from the bridge; if such pressures are unequal, a change in output will result proportional to the relative change in resistance in the strain wires, and hence proportional to the differential pressure in chambers 16 and 18.

Further, the pressure applied by the pressure fluid in one chamber, say 16, may be a positive pressure, while the fluid in the other chamber 18 may be under a negative pressure so as to produce a partial vacuum in chamber 18. In this case, the contraction of force summing bellows 26 will be transmitted to motion transmitting rod 54 to produce counterclockwise rotation of beam 50 on its hinge 46, and expansion of force summing bellows 28 will also produce, through motion transmitting rod 56, counterclockwise rotation of beam 52 about its hinge 48. Thus, wire 58 will be placed under tension while wire 70 will be relaxed. The increase in tension in wire 58 may be the same as or different than the reduction in tension in wire 70. The change in resistance in the wires will be sensed by the bridge, the output being linear to the relative change in resistance of the wires and to the differential pressure applied in chambers 16 and 18.

Figure 3:
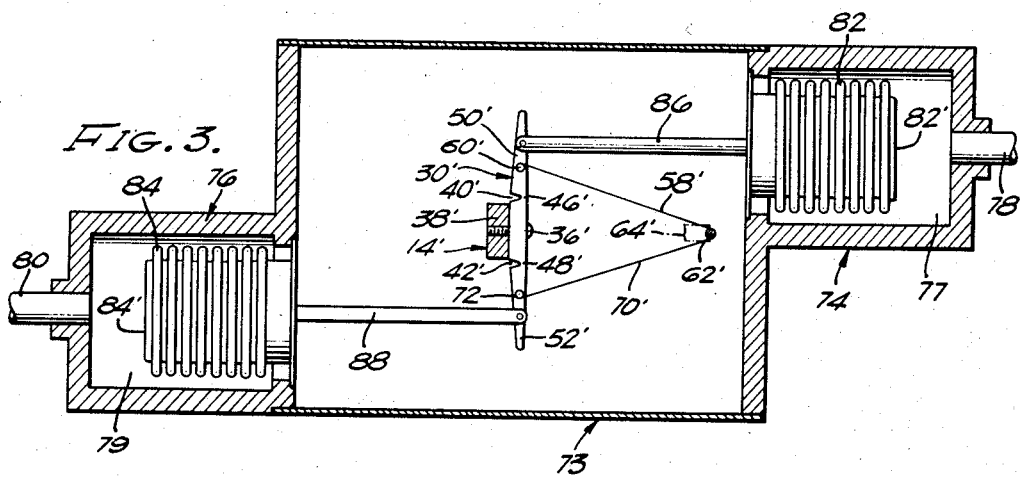
Fig. 3 is a horizontal section of a modification of the device of Fig. 1.

In Fig. 3, showing a modification of Fig. 1, numeral 73 is a case, to one end of which is connected a pressure head 74, a second pressure head 76 being connected to the opposite end of the case, these pressure heads being offset from each other, that is, on opposite sides of the longitudinal axis of the case. The pressure heads 74 and 76 have fluid inlets 78 and 80 connected to their outer end walls, respectively, for communication with the interior chambers 77 and 79 of the pressure heads. Connected to the inner end walls of pressure heads 74 and 76 are bellows 82 and 84, the outer ends of which carry end plates 82' and 84', respectively. Bellows 82 and 84 are each a movable force summing means.

In case 73 is mounted the same beam and strain wire structure supported at one end by a spring, as shown in Figs. 1 and 2. These elements in Fig. 3 accordingly are identified by the same numerals as employed for the corresponding elements in Figs. 1 and 2, except that the numerals in Fig. 3 are primed. A motion transmitting rod 86 connects beam 50' in Fig. 3 with the end plate 82' of bellows 82, and a motion transmitting rod 88 connects beam 52' with the end plate 84' of bellows 84.

In the modification of Fig. 3, it will be seen that positive fluid pressures in chambers 77 and 79 will produce counterclockwise pivotal motion of both beams 50' and 52' about their respective pivots or hinges 46' and 48', producing a corresponding motion of the first and third wire supports 50' and 72', resulting in an increased tension in wire 58' and a relaxation or decrease in tension of wire 70', such increase and decrease in tension being the same or different, both of said wires being connected to the second wire support 62' carried by the constraining means or spring 64'. Negative pressures applied in chambers 77 and 79 will produce clockwise rotation of beams 50' and 52' about their respective hinges, and a corresponding motion of wire supports 50' and 72', causing an increase in tension in wire 70' and a decrease in tension in wire 58' which may be the same or different from the increase in tension in wire 70'. Positive pressure in chamber 77 and negative pressure in the other chamber 79 will produce a tensioning of both wires 58' and 70', and positive pressure in chamber 79 and negative pressure in chamber 77 will product a relaxation of both wires, and the respective increases or decreases in tension may again be the same or different. The relative changes in resistance in the wires under the various conditions noted above will be sensed by the bridge to produce a change in output linear to such changes in resistance and to the differential pressure of the fluids in chambers 77 and 79.

Further, instead of using a single pair of strain wires as shown in the drawing, I may, for example, employ two pairs of strain wires, the second pair being likewise respectively connected to beams 50 and 52, but extending on the opposite side of the beams from strain wires 58 and 70, and connected to a second spring similar to spring 64. In this manner the instrument may be made more sensitive.

While I have described the transducers as applied to the measurement of the movement of rods connected to pressure responsive bellows for measurement of differential pressure between pressure fluids, the principles of the invention may also be applied to determine the movement of any force summing means resulting from any force. For example, the invention principles may be applied in connection with dynamometers, accelerometers and the like.

While I have described particular embodiments of my invention for the purpose of illustration, it should be understood that various modifications and adaptations thereof may be made within the spirit of the invention as set forth in the appended claims.

I claim:

1. An electrical resistance strain wire transducer comprising a movable force summing means, a first wire support, a motion transmitting connection between said movable force summing means and said wire support, a second wire support, a yieldable constraining means connected to said second wire support, a third wire support, a second movable force summing means, a motion transmitting connection between said second force summing means and said third wire support, a pair of electrical resistance strain wires, one of the wires of said pair being connected to and extending in tension between the first and second wire supports, and the second strain wire of said pair extending in tension between the second and third wire supports, whereby on movement of both of said force summing means each of said wires decreases or increases in tension.

2. A transducer according to claim 1, wherein the spring constant of said constraining means is less than the spring constant of said wires.

3. An electrical resistance strain wire transducer comprising a movable force summing means, a first wire support, a motion transmitting connection between said movable force summing means and said wire support, a movable second wire support, a spring connected to said second wire support, a third wire support, a second movable force summing means, a motion transmitting connection between said second force summing means and said third wire support, a pair of electrical resistance strain wires, one of the wires of said pair being connected to and extending in tension between the first and second wire supports, and the second strain wire of said pair extending in tension between the second and third wire supports, the sum of the tensions in the wires being less than the ultimate tensile stress of the wires, whereby on movement of both of said force summing means each of said wires decreases or increases in tension.

4. A transducer according to claim 3, wherein the spring constant of said spring is less than the spring constant of said wires.

5. An electrical resistance strain wire transducer according to claim 4, wherein the tension in both strain wire increases on movement by said first and second force summing means, of said first and third wire supports in the same direction away from said second wire support, the tension in both strain wires decreases on movement of said first and third wire supports in the same direction toward said second wire support, and one of said wires increases in tension and the other decreases in tension on movement of said first and third wire supports in opposite directions.

6. An electrical resistance strain wire transducer comprising a first pivoted beam, a first wire support mounted on said beam, a movable force summing means connected to said beam for movement thereof, a second wire support, a yieldable constraining means connected to said second wire support, a second pivoted beam, a third wire support mounted on said second beam, a second movable force summing means connected to said second beam for movement thereof, a pair of electrical resistance strain wires, one of the wires of said pair being connected to and extending in tension between the first and second wire supports, and the second strain wire of said pair extending in tension between the second and third wire supports, whereby on movement of both of said force summing means each of said wires decreases or increases in tension.

7. An electrical resistance strain wire transducer comprising a first pivoted beam, a first wire support mounted on said beam, a movable force summing means connected to said beam for movement thereof, a second wire support, a spring connected to said second wire support, a second pivoted beam, a third wire support mounted on said second beam, a second movable force summing means connected to said second beam for movement thereof, a pair of electrical resistance strain wires, one of the wires of said pair being connected to and extending in tension between the first and second wire supports, and the second strain wire of said pair extending in tension between the second and third wire supports, the sum of the tensions in the wires being less than the ultimate tensile stress of the wires, the spring constant of said spring being substantially less than the spring constant of said wires, whereby on movement of both of said force summing means each of said wires decreases or increases in tension.

8. An electrical resistance strain wire transducer comprising a first beam, a hinge for said beam, said beam being mounted for pivotal movement on said hinge, a first pin mounted on said beam, a movable force summing means connected to said beam for movement thereof, a second pin, a spring, said second pin being mounted on said spring, a second beam, a hinge for said second beam, said second beam being mounted for pivotal movement on said last mentioned hinge, a third pin mounted on said second beam, a second movable force summing means connected to said second beam for movement thereof, a pair of electrical resistance strain wires, one of the wires of said pair being connected to and extending in tension between the first and second pins, and the second strain wire of said pair extending in tension between the second and third pins, the sum of the tensions in the wires being less than the ultimate tensile stress of the wires, whereby on movement of both of said force summing means each of said wires decreases or increases in tension.

9. An electrical resistance strain wire transducer according to claim 8, in the form of a differential pressure gage, wherein each of said force summing means comprises a rod, said rods each being connected to a separate one of said beams, and a pressure responsive element connected to each of said rods, and wherein the spring constant of said spring is less than the spring constant of said wires.

10. An electrical resistance strain wire transducer according to claim 1, whereby on movement of said force summing means, each of said wires increases in tension.

11. An electrical resistance strain wire transducer according to claim 1, whereby on movement of said force summing means, each of said wires decreases in tension.

12. An electrical resistance strain wire transducer according to claim 1, whereby on movement of said force summing means, one of said wires increases in tension and the other wire decreases in tension an amount different from said increase in tension.

References Cited in the file of this patent

UNITED STATES PATENTS

| | | |
|---|---|---|
| 2,455,883 | Statham | Dec. 7, 1948 |
| 2,542,717 | Smith | Feb. 20, 1951 |
| 2,721,919 | Li et al. | Oct. 25, 1955 |
| 2,784,593 | Peucker | Mar. 12, 1957 |